United States Patent [19]
Calvignac et al.

[11] Patent Number: 6,044,079
[45] Date of Patent: *Mar. 28, 2000

[54] STATISTICAL PACKET DISCARD

[75] Inventors: Jean L. Calvignac, Cary, N.C.; Daniel Orsatti, La Gaude, France; Robert A. Sultan, Katonah, N.Y.; Fabrice J. Verplanken, La Gaude, France

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/943,606

[22] Filed: Oct. 3, 1997

[51] Int. Cl.[7] .............................. H04L 12/28; H04L 12/56
[52] U.S. Cl. ..................... 370/395; 370/230; 370/235; 714/48; 714/799
[58] Field of Search .................................. 370/389, 395, 370/396, 397, 398, 399, 229, 230, 231, 235, 237; 395/200.65, 200.7; 714/1, 48, 799

[56] References Cited

U.S. PATENT DOCUMENTS

| | | | |
|---|---|---|---|
| 5,444,706 | 8/1995 | Osaki | 370/230 |
| 5,459,743 | 10/1995 | Fukuda et al. | 371/67.1 |
| 5,517,497 | 5/1996 | Le Boudec et al. | 370/399 |
| 5,521,917 | 5/1996 | Watanabe et al. | 370/399 |
| 5,530,806 | 6/1996 | Condon et al. | 395/185.02 |
| 5,689,499 | 11/1997 | Hullett et al. | 370/235 |

*Primary Examiner*—Ajit Patel
*Assistant Examiner*—Bob A. Phunkulh
*Attorney, Agent, or Firm*—Ohlandt, Greeley, Ruggiero & Perle

[57] ABSTRACT

The present invention is an apparatus that manages Packet-Discard at a switch in an ATM network. The apparatus includes a table having a number of table addresses (or indexes). Each table address stores a record for incoming data cells of a frame. The records indicate whether data cells of the frame are be discarded. The number of possible cell identifiers is greater than the number of table addresses. The apparatus also includes a processor unit which receives a data cell having a cell identifier. The processor unit determines a table key, based on the cell identifier such that the table key is within the range of the table addresses. The processor unit then searches a record in the table associated with the table key to determine whether the data cell is to be discarded.

32 Claims, 7 Drawing Sheets

| VCC HASH TABLE | | |
|---|---|---|
| TABLE-INDEX<br>83 | FRAME IN TRANSIT<br>(YES/NO)<br>84 | PACKET DISCARD<br>(YES/NO)<br>85 |
| 0 | NO | -- |
| 1 | NO | -- |
| [...] | [...] | [...] |
| 1062 | YES | NO |
| [...] | [...] | [...] |
| 3219 | YES | YES |
| [...] | [...] | [...] |
| N-1 | NO | -- |

FIG.6

STATISTICAL PACKET DISCARD

FIELD OF THE INVENTION

The present invention relates to a method and apparatus for managing data traffic in an ATM network and, more specifically, for selective discarding of frames in an ATM network.

BACKGROUND OF THE INVENTION

Asynchronous Transfer Mode (ATM) provides connection-oriented transport of data across a network of switching devices. Frames of data are segmented into fixed-size data cells, having a 5-byte cell header and 48-byte payload, for transmission across the network. The term "frame" will be used herein interchangeably with the term "packet". These data cells are transported on a Virtual Channel Connection (VCC) identified by the concatenation of a 16-bit Virtual Channel Identifier carried in the cell header.

The 12-bit VPI value is used for transport between switches (i.e., Node-to-Node Interface or NNI) and the 8-bit VPI value is used for transport between a user-device and a switch (User-to-Network Interface or UNI). The VCC may transport data between two points or from a single point (i.e., root) to multiple points (i.e., leaves). The former is called point-to-point connection and the latter is a point-to-multipoint connection. The segment of an end-to-end connection between two devices is known as a link. The activity of routing a received cell from an inbound link to one or more outbound links associated with the connection is called switching.

VCCs may be bundled into a Virtual Path Connection (VPC) for transport through a sequence of network switches. The VPC is identified by the VPI value in the cell header. Information is stored in each network switch to indicate whether cells associated with a particular VPI value should all be switched in common (VP switching) according to the VPI value or, should be switched individually according to the concatenation of VPI and VCI values (VC switching).

At the endpoints of an ATM connection, a function called the ATM Adaptation Layer (AAL) is provided as an interface between ATM user applications and the cell-based ATM transport. One such ATM Adaptation Layer is AAL-5, which provides an interface for transport of variable length frames of data (as are common in Local Area Network (LAN) and Frame-Relay environments). An important function of AAL-5 is the segmentation of frames into ATM cells at the network ingress, and the reassembly of cells into frames at the network egress.

An ATM connection is associated with one of five service categories describing the method to be used for traffic management. One of these methods is called Unspecified Bit Rate (UBR), which is intended for best-effort transport of data. Such a method does not guarantee delivery of data. Specifically, when congestion occurs, the ATM network may discard cells. However, there is no standard method for performing traffic management of UBR traffic. When a cell is discarded, the destination (i.e., the endpoint) is unable to reassemble the cell into the associated frame. Higher programming layers enable recovery from the loss of the frame. An example of such a higher layer is the Transmission Control Protocol (TCP) of the Internet Protocol (IP). The term "Packet-Discard" will be used hereinafter to refer to the dropping or discarding of frames in the network.

One approach to manage Packet-Discard is Partial Packet Discard (PPD), which discards one or more data cells of a frame, without discarding all cells of the frame. When a data cell is received at a network switch, the switch determines whether the data cell should be dropped due to congestion. However, assuming that (i) an average of 10 percent of data cells are dropped over time, (ii) an average frame contains 10 cells and (iii) the distribution of dropped cells is uniform, the rate of incomplete frame reception at the destination will be very high. This will result in a high volume of retransmission requests and an increase in network congestion.

A better approach to manage Packet-Discard is Early Packet Discard (EPD), which is generally implemented for traffic on each AAL-5/UBR VCC. When a first cell or frame is received at a network switch, queues are examined to determined whether congestion has reached a point where dropping of cells may soon be necessary. If so, the network switch discards the first cell and all subsequent cells associated with the frame. This is accomplished by marking VCC information, in the network switch, with an indication (frame-drop marker) that all data cells of the marked frame should be discarded. The arriving data cells of the marked frame are continuously discarded until an end-of-frame cell is received, at which time the frame-drop marker is removed.

A problem arises when the cell containing the end-of-frame marker has been lost, as a result of transmission error or congestion at an earlier switch not performing the EPD function. In such a case, the subsequent frame on the particular VCC will also be discarded. This situation is, however, assumed to be an infrequent occurrence. Accordingly, EPD allows the network switch to avoid forwarding partial frames that are of no use to the recipient, to reduce the number of frames requiring retransmission, and to reduce congestion of the switching nodes.

However, in some nodes, AAL-5/UBR traffic is carried on Virtual Path (VP) connections, and VP switching is performed at the switching nodes. In this case, there is no convenient way to perform EPD. Specifically, when VP switching is performed, the switch examines only the VPI field of the cell header. All cells having the same VPI value are switched to a common outbound VP link (or set of VP links in the case of point-to-multipoint system). The switching tables used for VP switching do not contain any reference to individual VCCs. As a result, there is no place to record information that all data cells of a frame belonging to a particular VCC should be dropped.

Moreover, there is no method to recognize when a first cell of a frame (i.e., beginning-of-frame cell) has been received. As ATM cells do not include a beginning-of-frame marker, information that a first cell of a frame has been received is inferred from information that the previous cell, with the same VCC, was an end-of-frame cell. This is not a problem when Virtual Channel (VC) switching is employed because there is information about individual VCCs. However, it is problematic when VP switching is performed. In the latter case, there is currently no way to retain information as to whether a previous data cell, with the same VCC, was an end-of-frame cell.

One possible solution is to employ a look up table, associated with each VP passing through the switch. The table will contain all possible values of VCI for that VP. When a cell is received, the table is searched or indexed to identify an entry associated with the VCI value in the cell header. The entry can be used to store information that a previous cell with the VCI value was an end-of-frame cell and that data cells associated with the frame are to be discarded. However, the very purpose of introducing VP switching, is to avoid the necessity of a large table containing all VCI values. This solution defeats the intended purpose of VP switching.

An alternative approach is to maintain a database (e.g., a tree structure), associated with each VP connection. The tree structure contains an entry for each VCI for which a cell has been received, but an end-of-frame cell has not been received. Conceptually, this is a dynamic representation of each frame passing through the switch. When an arriving data cell does not have a corresponding entry in the database, the network switch can infer that the data cell is a beginning-of-frame cell (unless of course, a data cell was dropped in an earlier switch). In this case, an entry in the database is created. It is then determined whether the level of congestion is such that EPD should be performed. If so, the database entry is marked, and subsequent cells of the frame will be discarded. When the end-of-frame cell is received, the database entry is cleared or destroyed. Again, it is possible that an end-of-frame cell may have been discarded at an earlier node, which will result in discard of the subsequent frame.

The problem with this implementation is the number of steps required to perform a search to find a particular database entry. In order to be effective, the search must be completed within the time required to switch the cell. However, it is difficult to guarantee that the required number of search steps can be performed within the time period.

In view of the foregoing, there is a need to provide a better approach to managing Packet-Discard, in the event of data congestion at a network switch. There is also a need to provide such an approach with minimal hardware and software at the network switch and with the capability of performing a Packet-Discard operation within the time allotted for a switching operation.

Accordingly, it is an object of the invention to provide a method and apparatus for managing Packet-Discard to alleviate data congestion at the ATM switched.

It is a further object of the invention to provide at each ATM switch or switch adapter, an addressable table for tracking cells of each frame received at the network switch.

Another object of the invention is to provide a table as described above which requires minimal storage space and can be incorporated into an ATM switch or adapter.

A further object of the invention is to employ hashing techniques to minimize the size of the table and the time for searching a record stored in the table.

Another object of the invention is to provide the above features in an ATM switch that employs Virtual Path (VP) switching.

SUMMARY OF THE INVENTION

The present invention is an apparatus that manages Packet-Discard at a switch in an ATM network. The apparatus includes a table having a number of table addresses (or indexes). Each table address stores a record for incoming data cells of a frame. The records indicate whether data cells of the frame are be discarded. The number of possible cell identifiers is greater than the number of table addresses. The apparatus also includes a processor unit which receives a data cell having a cell identifier. The processor unit determines a table key, based on the cell identifier such that the table key is within the range of the table addresses. The processor unit then searches a record in the table associated with the table key to determine whether the data cell is to be discarded.

The present invention provides a table that is capable of storing information for tracking and identifying each incoming frame and for indicating that the data cells of a particular frame are to be discarded. Such a table can be configured according to the availability of memory storage space at the switch or switch adapters, and can be searched within the time it takes to perform a switching operation.

One drawback with such a table is the possibility that two or more incoming frames of data cells may have the same table key, i.e., a collision. A single record may only store information for data cells of a single frame. Therefore, in the event of a collision, e.g., between two frames, the network switch of the present invention does not update the record associated with the data cells of the second-to-arrive frame. Instead, the network switch continues to route or discard data cells of both colliding frames, according to the information already stored in the record (e.g., the information of the first-received beginning-of-frame cell). Upon receipt of an end-of-frame cell for one of the colliding frames, the network switch clears the record.

At this point, it is important to understand that the network switch treats all data cells associated with the record in the same manner, e.g., according to the information already stored in the record, until receipt of an end-of-frame cell. This results from the fact that the network switch does not detect for collisions. The network switch only updates information in the record upon detection of a beginning-of-frame cell (e.g., where the record associated with an arriving data cell is "empty") or an end-of-frame cell.

Thereafter, the network switch treats the next arriving data cell from the frame for which an end-of-frame was not received, as a beginning-of-frame cell, since the associated record is now "empty". The network switch then updates the record with information as to whether the data cells of the frame are to be discarded. The remaining data cells of the frame are routed or discarded, according to the updated information in the record, until an end-of-cell is received.

The worst case collision scenario occurs when (1) one frame is intended for discard, and (2) the other frame is meant to be routed or switched (ignoring the low probability cases of multiple simultaneous collisions). In this case, the network switch performs a Partial Packet Discard (PPD) on the frame for which EPD was intended, and on the other frame which did not require EPD. Alternatively, where Packet-Discard is either indicated or not indicated for both colliding frames, collision causes no problem. In particular, the information stored in the record is applicable to both colliding frames.

Therefore, if the rate of collision is low, the Packet-Discard of the present invention provides a good method for managing congestion control of AAL5/UBR traffic on VP connections because it is efficient with respect to storage and processing cycles. In the worst case, a collision will result in a retransmission of the frames of the discarded data cells. The benefits gained in utilizing such a table, thus, outweighs the detriment of a collision occurrence.

BRIEF DESCRIPTION OF THE DRAWINGS

FIG. 6 illustrates a Virtual Channel Connection (VCC) table.

DETAILED DESCRIPTION OF THE PREFERRED EMBODIMENTS

Figure 1:
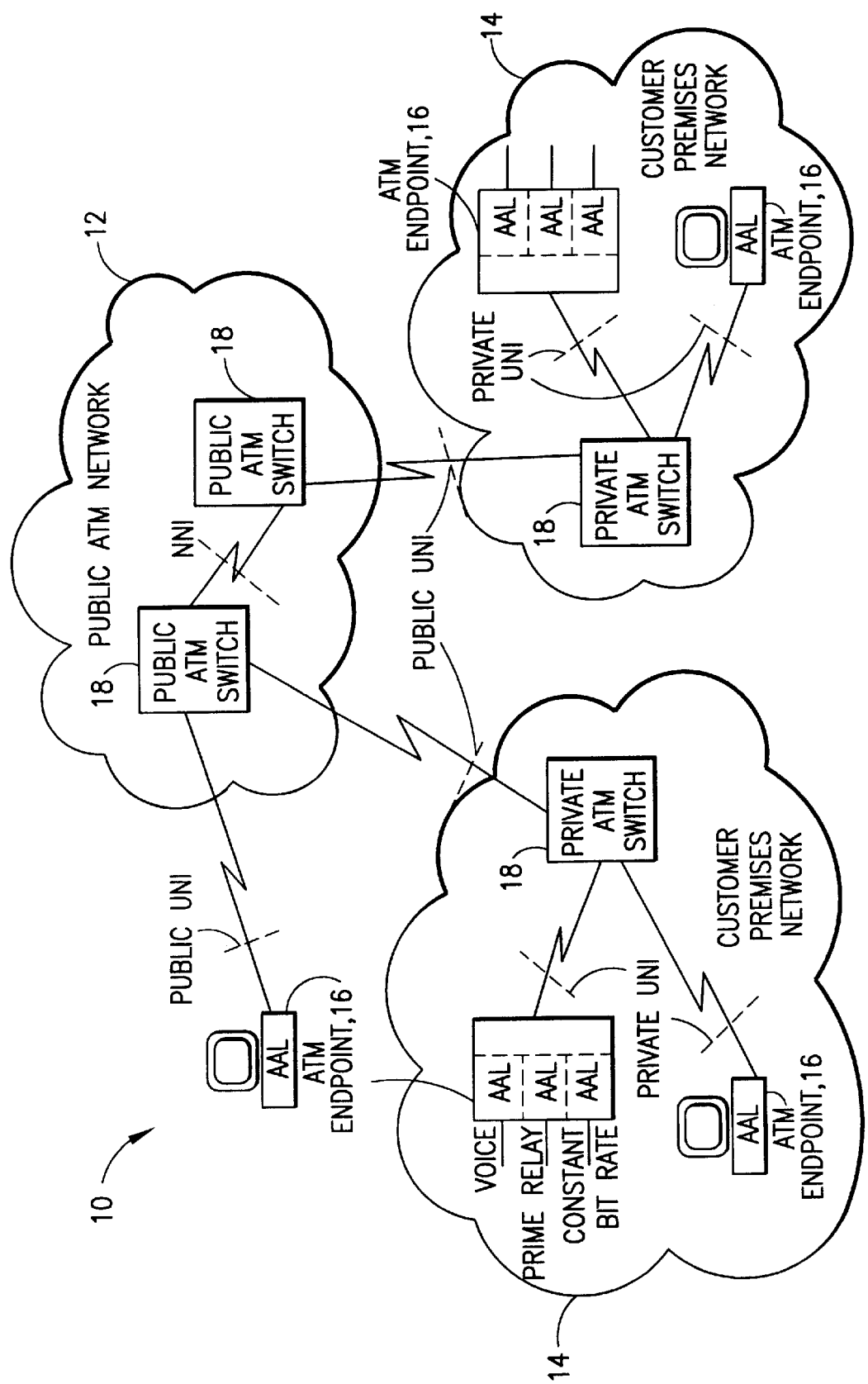
FIG. 1 illustrates a conceptual structure of an ATM network.

Before proceeding with a detailed description of the invention, it is well to define certain terms to be used herein. The term "Cell Identifier", as used herein, refers to any type of information that may be used to identify data cells of a particular incoming frame. This may include information typically associated with a transmission pathway (i.e., a destination pathway address) as found in the cell header, such as a Virtual Path Identifier (VPI) and Virtual Channel Identifier (VCI). In addition to the transmission pathway, the cell identifier may also include any additional information, such as the port number from which the data cell was received, . . . etc., to further distinguish the data cell of a particular frame from other data cells of other frames.

It is preferred that the port number be incorporated into the cell identifier. In particular, port numbers are assumed to be globally unique with respect to the switch, When applied to an inbound switch adapter, the port numbers are unique with respect to the adapter. When applied to an outbound switch adapter, the port number can be replaced by a unique number associated with the inbound adapter from which the cell was received.

The term "table key" (M) refers to a number for indexing and identifying a particular record in a table. It is preferred that the table key (M) for a particular data cell is the cell identifier.

The term "hashing" or "hashing operation" refers to the method of converting a table key (M) into an integer within a limited range, where the number of possible table keys is greater than the table size (N). This is accomplished by employing a hashing function H (i.e., a mathematical formulation or any bit manipulation) which reduces the value of M to a value H(M) within the range of the table indexes, i.e., between [0 . . . N–1], [N–100 . . . N+100], etc. For instance, if M=32, N=16 and the table indexes are [0 . . . N–1], the high order 16-bits of M can be Exclusive Ord (XOR) with the low order 16-bits of M to produce a 16-bit hashed value (a new M). Hashing and hashing functions are generally known and will not be described in any further detail. A "hash table" refers to a table that is searched by a hashed table key H(M) (hereinafter "hash key").

Hashing is often utilized to minimize table size and to maximize use of space in the table (i.e., reduce waste). At the same time, hashing allows the table to be searched in approximately the same amount of time it takes to perform a direct address search (without hashing). Accordingly, a hash table is particularly useful for storing records, where the memory storage space is limited and a record search must be performed quickly and efficiently.

One drawback with the use of hashing is the possibility of a "hash collision" or "hash clash". Hash collision refers to the situation when two different table keys M1 and M2 have the same hashed value, H(M1)=H(M2). When a record for table key M1 is entered into the table, it is inserted at position table index H(M1). When key M2 is hashed, the record for M2 will be inserted into position table index H(M2), the same table index already utilized by M1. Clearly, two records cannot occupy the same position in the table. However, for the purposes of the present invention (to be described in detail below), the benefits of utilizing a hash table overrides the detriment of a hash collision.

Turning to the present invention, FIG. 1 illustrates an overview of an ATM network architecture 10, which includes Private ATM networks 14 connected across a Public ATM network 12, via a User Network Interface (UNI). Each Private and Public ATM network 12, 14 has connected thereto a plurality of ATM Endpoints 16 (i.e., a transmitting or receiving party), and includes a plurality of network switches 18 for directing or routing the flow of data between ATM Endpoints 16. Each ATM Endpoint 16 includes an ATM Adaptation Layer (AAL), for adapting or converting various traffic types that use the ATM network. The AAL connects higher protocol layers and functions to the ATM cell-switching network 10. In general, the AAL of a transmitting ATM endpoint 16 takes frames (i.e., blocks) of data, disassembles them into data cells, and adds necessary information to each cell header to allow rebuilding of the original frame at the receiver. The AAL of a receiving ATM endpoint reassembles the original frame from the individual data cells. In this way, each ATM Endpoint 16 can, thus, transmit and receive data to and from another ATM Endpoint 16, across ATM network 10.

Figure 2:
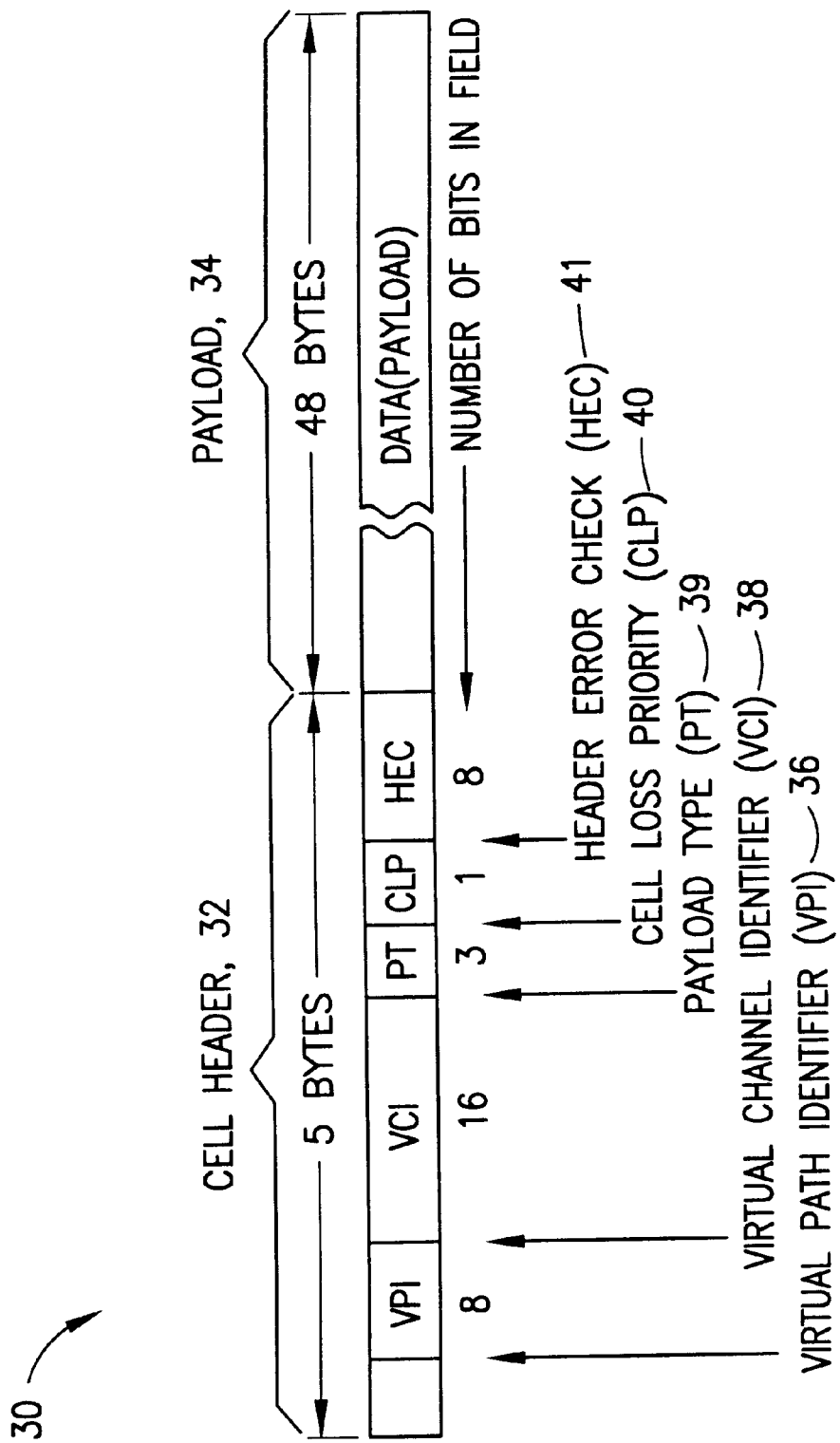
FIG. 2 illustrates a format of an ATM cell.

Referring to FIG. 2, an ATM data cell format 30 includes a five-byte cell header 32 and a 48-byte payload 34 (i.e., the data being transmitted). Cell header 30 generally includes a Virtual Path Identifier (VPI) 36, a Virtual Channel Identifier (VCI) 38, a Payload Type 39, a Cell Loss Priority (CLP) 40 and a Header Error Check (HEC). The VPI and VCI fields together identify a Virtual Channel Connection (VCC) for the data cell, which is a concatenation of virtual channel links that extends between two points where the adaptation layer is accessed. The VPI/VCI are similar in function to the Logical Channel Identifier in X.25 or the Data Link Connection Identifier (DLCI) of a frame relay in that they do not identify the destination address of the cell explicitly, but rather identify a connection which leads to the desired destination. At present, the VCI field is a 16-bit value. The VPI is a 12-bit value at the Network Node interface (e.g., for transport between switches), and a 8-bit value at the User Network Interface (e.g., for transport between a user device and a switch).

Payload Type 39 is typically a three-bit field. The first bit determines if the cell is for a user data flow or for operations administration and management (OA&M). The second bit is used to determine whether congestion was experienced along the cell's route. The third bit identifies whether the cell is the end of a block of user data, and is utilized by the higher layers.

Cell Loss Priority 40 indicates the priority of the data cell (low or high). In the event of congestion at network switch 18, the switch may discard arriving cells based on their priority. Header Error Check 41 allows the correction of all single-bit error in the cell header or for the detection of most single and multiple-bit errors.

Figure 3:
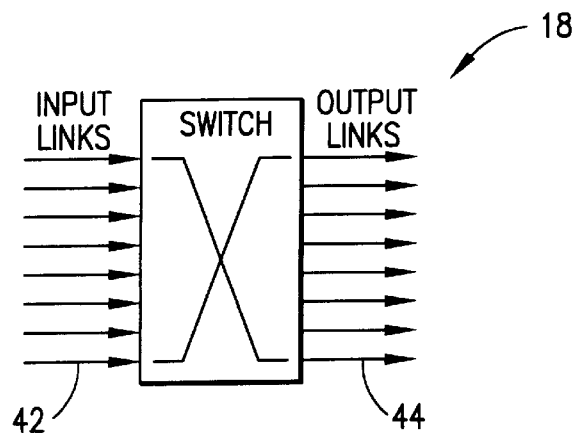
FIG. 3 illustrates a network switch.
Figure 4:
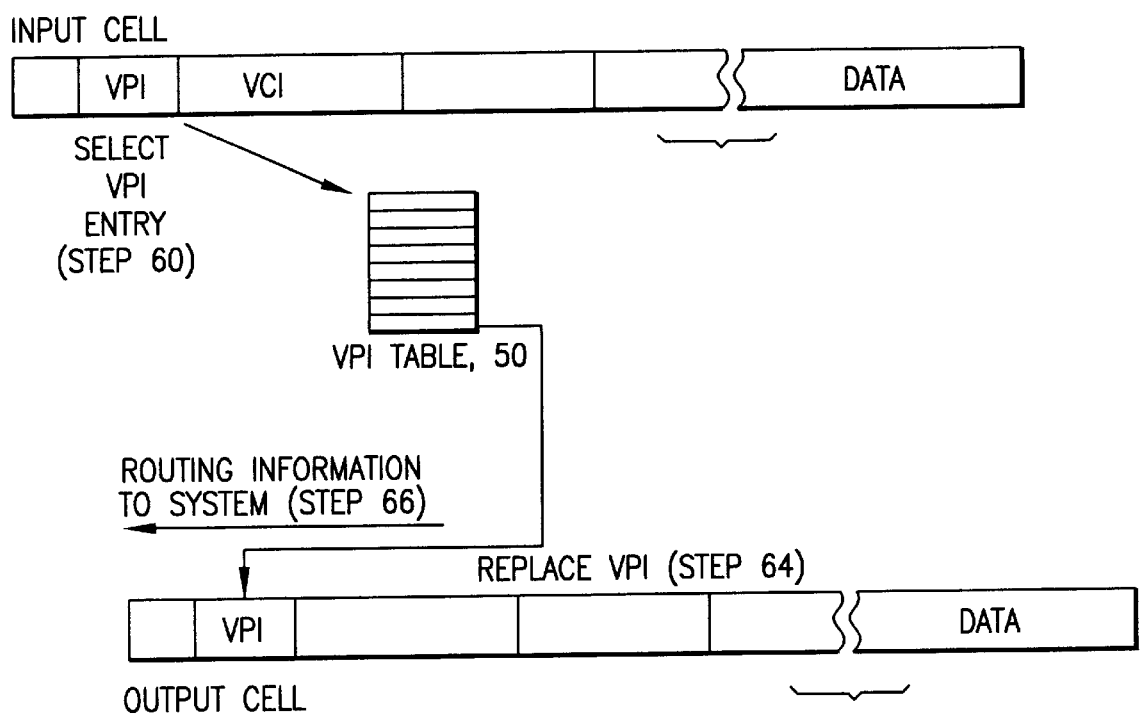
FIG. 4 illustrates a block diagram of a typical process of switching a data cell at a network switch.

Referring to FIGS. 3 and 4, a typical implementation of Virtual Path (VP) switching is shown. Initially, network switch 18 receives a data cell (i.e., input cell) on an inbound link 42, either from an ATM endpoint 16 or another network switch. Network switch 18 examines the cell header to determine on which outbound link the data cell must be forwarded. In particular, network switch 18 accesses a VPI table 50 with the VPI in the cell header and selects a new respective VPI (Step 60). Network switch 18 then replaces the old VPI with the new VPI (Step 64). The data cell, now an outbound cell, is routed to the appropriate outbound link 44 and retransmitted to its next destination (Step 66). It is important to understand that the above process relies on maintaining connection tables for each Virtual Path Connection (VPC) to be recognized by the network switch. There is a separate set of tables for each inbound link, since the VPI fields are only unique within the context of a particular link.

In the event of congestion at network switch 18 (employing VP switching), there is currently no mechanism in the switch to track individual frames and their data cells, and to discard all data cells of a particular frame. Specifically, in VP switching, network switch 18 has no way to determine whether a data cell is a beginning-of-frame cell or an end-of-frame cell. All data cells having the same VPI value are switched to a common outbound VP link or set of VP links in the case of point-to-multipoint system. The switching table (e.g., the VPI table) used for VP switching does not contain any reference to individual VCCs. As a result, there is no place to record the information that cells of a particular frame should be discarded.

To overcome the problems with managing Packet-Discard at a network switch which implements VP switching, it has been discovered that a Virtual Channel Connection (VCC) hash table, which is capable of maintaining records of each arriving data frame, can be incorporated into network switch 18. The records are continuously searched for each arriving data cell. In this way, it is possible to determine whether a data cell is a beginning-of-frame cell or end-of-frame cell and whether the data cell belongs to a frame that is to be discarded. At the same time, the size of the VCC hash table can be configured according to the availability of storage space at network switch 18.

However, it should be understood that the Packet-Discard operation of the present invention is imperfect, in the sense that there is a possibility of a hash collision ("Imperfect Packet Discard"). Hash collision can occur whenever any part of one frame overlaps with any portion of another frame having the same hash key H(M). Assuming that, on the average, a network switch forwards C cells between the time that it receives the first cell of a frame and the time it receives the last cell of the frame, there are thus C-number of VCC Hash table entries in use at any time (ignoring collisions that may have already occurred). When a cell arrives, the probability is approximately C/N that a collision will occur. For instance, if there are 64K table entries (N=64,000) and an average of 100 frames simultaneously in transit through the switch, the probability of a hash collision is approximately 1.6 percent.

In the event of a hash collision between two frames, the network switch does not update the table record according to the data cell of the second-to-arrive frame. Instead, the network switch continues to route or discard data cells of both colliding frames, according to the information already stored in the table record (e.g., the information of the first-to-arrive beginning-of-frame cell). Upon receipt of an end-of-frame cell for one of the colliding frames, the network switch clears the table record.

At this point, it is important to understand that the network switch treats all data cells associated with the table record in the same manner, i.e., according to the information already stored in the table record, until receipt of an end-of-frame cell. This results from the fact that the network switch does not detect for the occurrence of hash collisions. The network switch only updates information in the table record upon detection of a beginning-of-frame cell (e.g., where the table record associated with an incoming data cell is "empty") or an end-of-frame cell.

Thereafter, the network switch treats the next arriving data cell from the frame for which an end-of-frame was not received, as a beginning-of-frame cell, since the associated table record is now "empty". The network switch then updates the table record with information as to whether the data cells of remaining frame is to be discarded. The incoming data cells of the remaining frame are routed or discarded, according to the updated information in the record, until an end-of-frame cell is received.

The worst case collision scenario occurs when (1) one frame is intended for discard, and (2) the other frame is meant to be routed or switched (ignoring the low probability cases of multiple simultaneous collisions). In this case, the network switch performs a Partial Packet Discard (PPD) on the frame for which EPD was intended, and on the other frame which did not require EPD. As a result, a retransmission of the discarded cells would be required. Alternatively, where Packet-Discard is either indicated or not indicated for both colliding frames, hash collision causes no problem since the information stored in the table record is applicable to both colliding frames.

Therefore, if the rate of collision is low, the Packet-Discard of the present invention provides a good method for managing congestion control of AAL5/UBR traffic on VP connections because it is efficient with respect to storage and processing cycles. In the worst case, hash collision will only result in a retransmission of the discarded data cells. The benefits gained in utilizing such a table, thus, exceeds the detriment of a hash collision occurrence.

Figure 5:
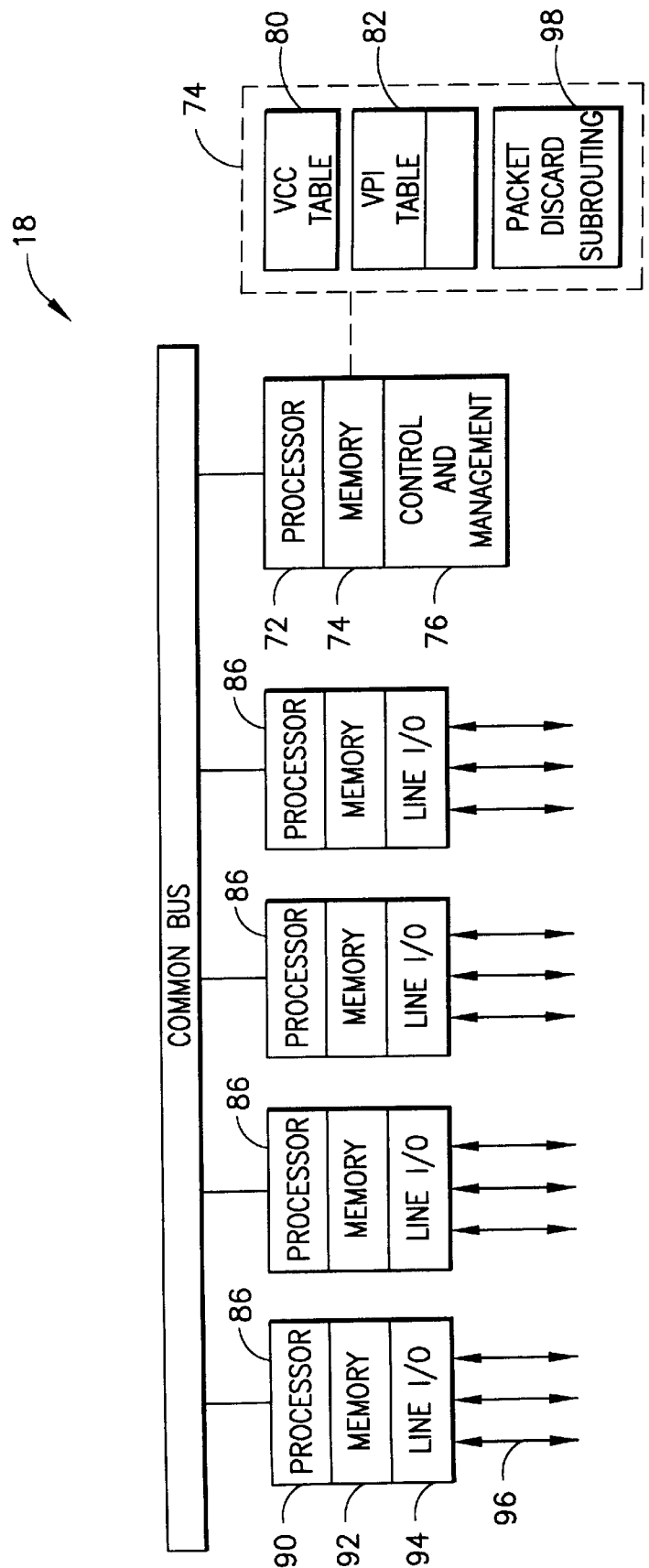
FIG. 5 illustrates a single bus network switch.

Referring to FIG. 5, there is provided a block diagram of network switch 18, in accordance with the present invention. Network switch 18 is configured in a manner known in the prior art, except for the inclusion of a VCC Hash table 80 and a Packet-Discard subroutine 98. Network switch 18 includes a primary central processing unit (CPU) 74 for controlling the components of the switch, a primary memory storage device for storing a management control subroutine 76, Packet-Discard subroutine 98, VPI table 82 and a VCC Hash table 80.

Packet-Discard subroutine 98 in combination with primary CPU 72 controls the discarding of arriving data cells, in the event of congestion at the network switch. In general, primary CPU 72 recognizes the first data cell of a frame (beginning-of-frame cell) and marks the appropriate record field in VCC Hash table indicating that a frame is in transit and whether the cells of the frame are to be discarded. Primary CPU 72 further discards each data cell of a frame that has been marked in the VCC Hash table 80 for discard. Finally, primary CPU 72 removes any markings from VCC Hash table 80 (i.e., clears the record), when the end-of-frame cell is detected.

As shown in FIG. 5, network switch 18 further includes a plurality of switch adapters 86 for controlling the inbound and outbound data traffic. Each switch adapter includes an adapter CPU 90 for controlling the components of the switch adapter, memory storage device 92 for storing incoming and outgoing data (i.e., a buffer) and a communication interface 94 for receiving incoming data and transmitting outgoing data. Reference numeral 96 generally refers to the inbound and outbound links. Although the Packet-Discard subroutine 98, as described above, is implemented by primary CPU 72, VCC Hash table 80 can be stored alternatively in each switch adapter 86 and Packet-Discard subroutine 98 can be performed by individual switch adapters 86. Performing the Packet-Discard subroutine 98 at the switch adapter level may be preferable, as congestion control is typically performed at each switch adapter.

Note that, while a single bus switch architecture is described in FIG. 5, network switch 18 may alternatively be configured with a different-type of switch architecture, such as a traditional packet switch architecture, crosspoint switch architecture, multi-stage switching architecture and so forth. Such switch architectures are known in the art and will not be described herein.

Referring to FIG. 6, a VCC Hash Table 80 includes a Table-Index field 83, a Frame-In-Transit field 84 and a Packet-Discard field 85. Table-Index field 83 indicates a table address or entry for searching records on the table. As shown, there are preferably N table indexes [0 . . . N–1], where N is a numerical value less than the number of possible VCCs. Frame-In-Transit field 84 refers to whether a data frame, associated with a particular Table-Index field 83, is still in transit to network switch 18. Frame-In-Transit field 84 allows network switch 18 to track the beginning to end of each frame received at the switch.

Packet-Discard field 85 indicates whether data cells of a data frame, belonging to a VCC, are to be discarded. In the event of network congestion, network switch 18 (via primary CPU 74 or switch adapter CPU 86) marks incoming data frames for discard. Whether a data frame and its respective data cells are to be discarded is typically dependent on factors, such as the priority of the data frame. The priority of a data frame can be found in the cell header, e.g., the Cell Loss Priority (CLP), of each arriving data cell (FIG. 2). Network switch 18 may also discard data cells by their service class or randomly depending on the switches implementation. Accordingly, network switch 18 can mark the Discard-Packet field 85 corresponding to frames which are to be discarded.

As shown in the example of FIG. 6, data cells of a particular frame received at network switch 18 and having associated therewith a table index 3219 are to be discarded, whereas data cells of a different data frame, associated with table index 1062, are not to be discarded. In this way, network switch 18 may utilize Virtual Path (VP) switching and, at the same time, maintain a status record of each data frame in transit. In the event of data congestion at the switch or in the ATM network, network switch 18 can, thus, selectively discard entire data frames (and not only particular data cells) and minimize or eliminate the transmission of partial frames through ATM Network 10.

Figures 7, 7A:
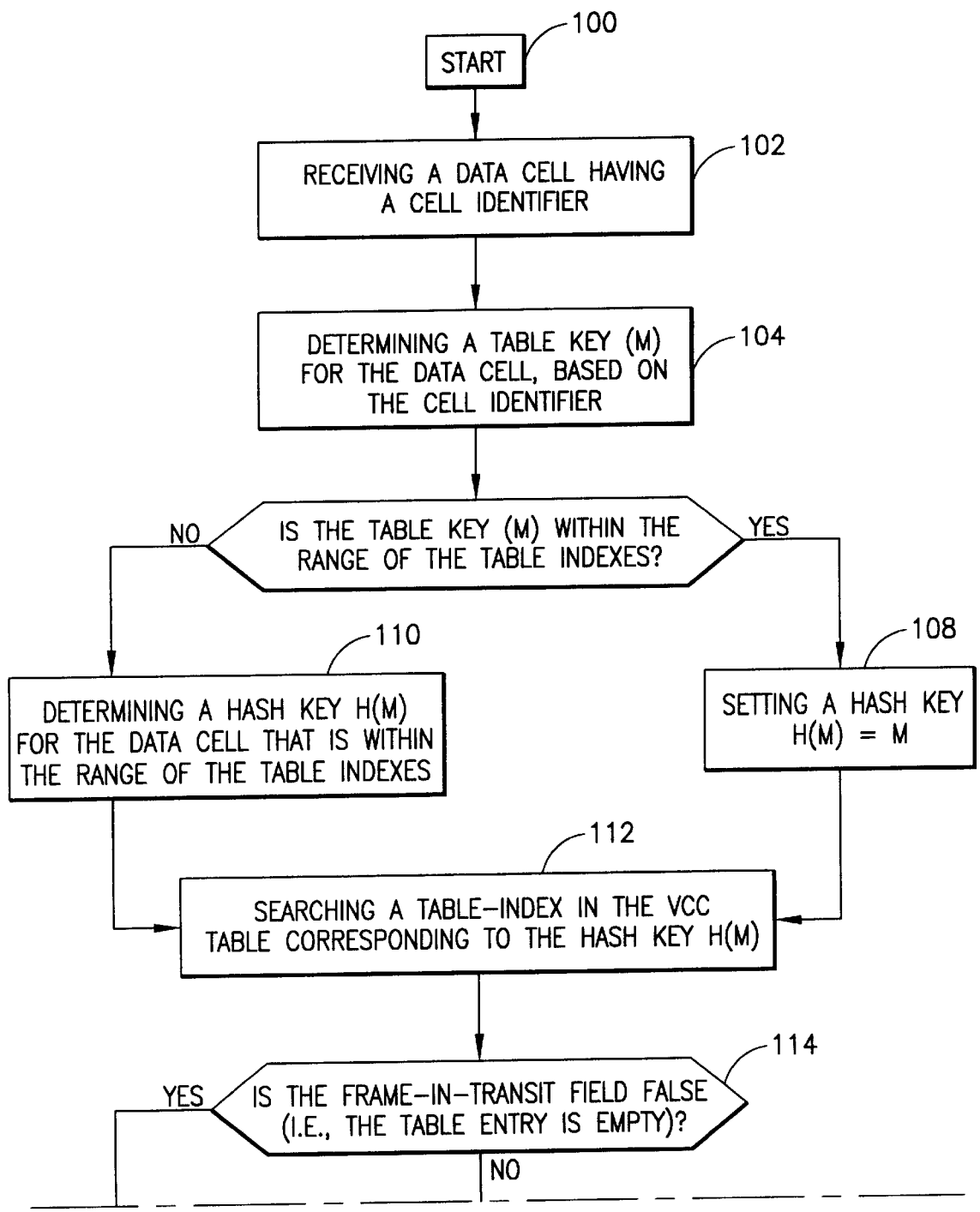
FIG. 7A–7B illustrates a logical flow diagram of a Packet-Discard subroutine.
Figure 7B:
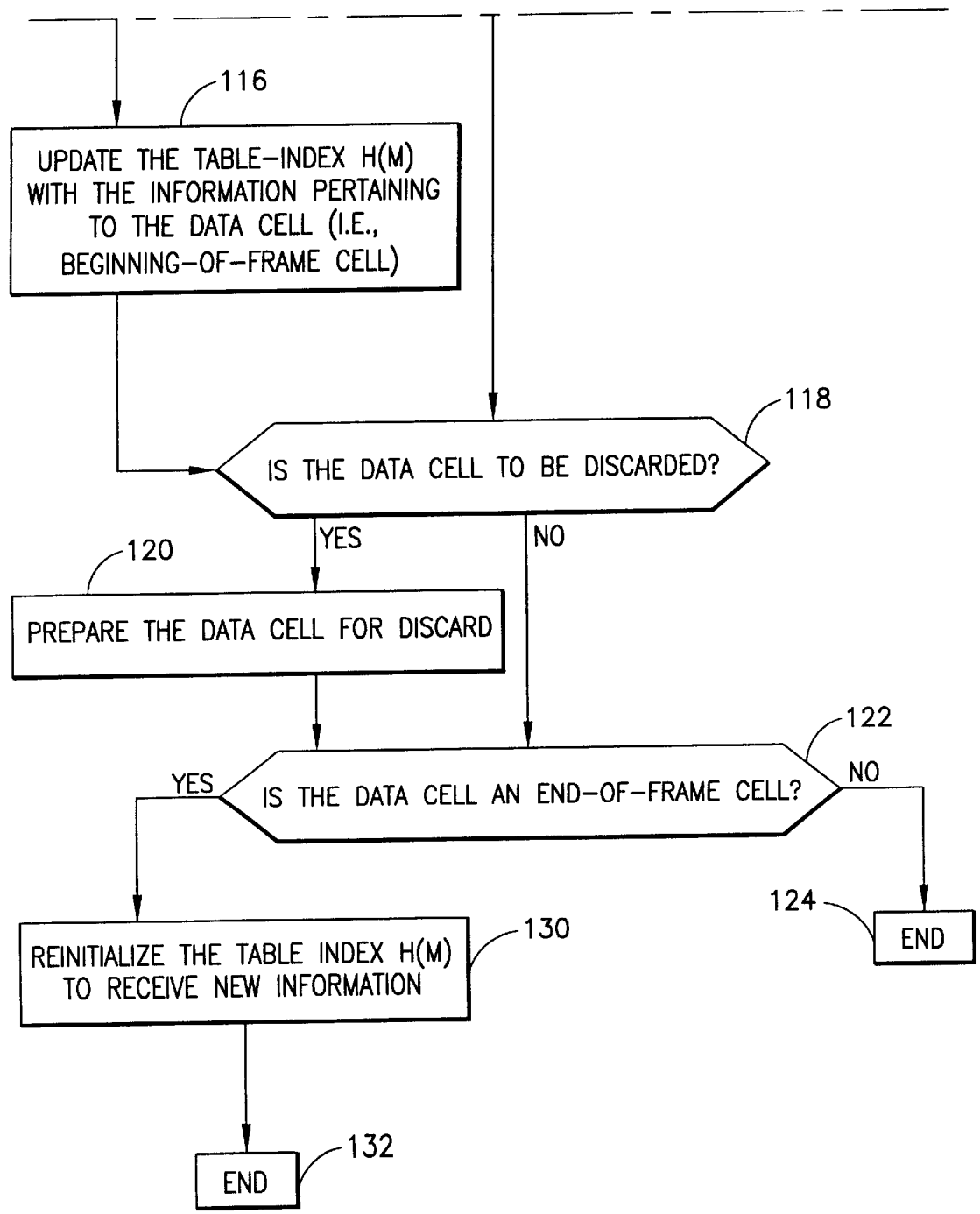

Referring to FIG. 7, there is provided a logical flow diagram of Packet-Discard subroutine 98, in accordance with the present invention. Initially, network switch 18 receives a data cell which has associated therewith a cell identifier (Step 100). The cell identifier may include a Virtual Path Identifier (VPI), Virtual Channel Identifier (VCI), the port number, etc. or a combination thereof. Network switch 18 determines a table key M for the data cell, based on the cell identifier (Step 104). For instance, if the VCI has X-bits (X), the VPI has Y-bits (Y) and a Z-bit value (Z) indicates the number of receiving port, the following formula can be used to determine the table key M:

$$M = X + Y + Z. \tag{1}$$

However, it should be understood that any value of M may be employed, so long as it is unique to the data cells of a frame.

Network switch 18 then determines whether the table key M is within the range of the table indexes in VCC Hash table 80 (Step 106). If the table key M is within the range of the table indexes (e.g., M can map onto the VCC Hash table), Hash key H(M) is preferably set to M (Step 108). In other words, the hash function is H(M)=M, but a different hash function may also be utilized. Otherwise, if the table key is outside the range of the table indexes, network switch 18 determines a Hash key H(M) that is within the range of the table indexes (Step 110). Specifically, network switch 18 employs hashing on table key M to obtain a hash key H(M), which is in the range of the table indexes N, e.g., H(M)<N or H(M)=N.

Thereafter, network switch 18 searches VCC table 80 for a table entry corresponding to the table key H(M) (Step 110). If the Frame-In-Transit field indicates that no frame is in transit (for the particular VCC), network switch 18 assumes that the data cell is a beginning-of-frame cell. For instance, as shown in FIG. 6, a table key M=1 for the data cell indicates a beginning-of-frame cell. In such a case, network switch 18 updates the Frame-In-Transit field to indicate that a frame is now in transit, e.g., changing "No" to "Yes" (Step 116). In the event of network congestion, network switch 18 can also update the Discard-Packet field to indicate that all cells of the frame are to be discarded.

Thereafter, network switch 18 accesses the Discard-Packet field of Table-Index M and determines whether the data cell should be discarded (Step 118). If so, network switch 18 prepares the data cell for discard (Step 120). In either cases, network switch 18 then accesses the cell header of the data cell to determine whether the data cell is an end-of-frame cell (Step 122). If not, network switch 18 terminates the process (Step 124) and starts the process over with the next arriving data cell (Step 100).

Otherwise, network switch 18 reinitializes or clears the fields in Table-index M to receive new information (Step 130). Specifically, the Frame-In-Transit field is set to indicate no frame in transit ("No"), and the Packet-Discard field is set to "empty" or "--". Network switch 18 then terminates the process (Step 132) and starts the process over with the next arriving data cell (Step 100).

It should be noted that one problem with the Packet-Discard operation of the present invention is the possibility of a hash collision or clash. Hash collision or clash refers to the situation when two or more different frames of data cells, arriving simultaneously at network switch 18, have the same hash key H(M). This is problematic since the status information of both frames cannot occupy the same space in VCC Table 80. An operational example of a worst case hash collision scenario is provided below to explain how the present invention handles a hash collision.

For instance, assume that an incoming data cell of a first frame has a cell identifier (M), associated with a hash key H(M)=1, and is marked or intended for discard (FIG. 6). Network switch 18 searches the record at Table-Index H(M) or "1" which is empty (Frame-In-Transit="No"), and assumes that the data cell is a beginning-of-frame cell (Step 112). Network switch 18 updates the record of Table-Index "1" such that Frame-In-Transit="Yes" and Packet-Discard= "Yes". Network switch 18 then discards the beginning-of-frame cell of the first frame and all other incoming data cells of the first frame, until an end-of-frame cell having a hash key H(M)=1 is received at network switch 18.

In the meanwhile, a data cell (i.e., a beginning-of-frame cell) for a second frame with an H(M)=1, arrives at network switch 18 after the beginning-of-frame cell of the first frame, but before the end-of-frame cell of the first frame. In other words, a hash collision has occurred between the first and second frames (i.e., an overlap). Network switch 18, however, does not update the record associated with H(M)=1 for the data cell of the second frame. The record at Table-Index H(1) is only updated upon detection of a beginning-of-frame cell or an end-of-frame cell, associated with the record.

As the Frame-In-Transit field="Yes", network switch 18 will treat the data cell of the second frame as a data cell of the first frame (i.e., instead of a beginning of-frame cell) (Step 114). Accordingly, the data cell of the second frame is discarded because Packet-Discard field="Yes" (Step 118). Network switch 18 will continue to discard data cells of both the first and second frames, until an end-of-frame cell for either the first or second frame is detected.

Assuming that an end-of-frame cell for the first frame is received, prior to an end-of-frame cell for a second frame, network switch 18 reinitializes or clears the record at Table-Index H(M)=1 (i.e., Frame-In-Transit="No" and Packet Discard="--") (Step 130). At this time, all data cells of the first frame and some data cells of the second frame (i.e., partial frame) have already been discarded.

Upon receipt of the next incoming data cell of the second frame, network switch 18 searches the record at Table Index H(M)=1, and assumes that the data cell is a beginning-of-frame cell because Frame-In-Transit="No". Network switch 18 then updates the record to Frame-In-Transit="Yes" and Packet-Discard="No" (as data cells of the second frame are not intended for discard). Assuming that no other collisions occur in VCC table 80 at Table-Index H(M)=1, network switch 18 will route the remaining incoming data cells of the second frame to the appropriate outbound link, until an end-of-frame cell having a hash key H(M)=1 is received.

Therefore, in the worst case scenario (as described above), network switch 18 performs a Partial Packet Discard (PPD) on (1) one frame for which EPD was intended (i.e., the first frame) and (2) one frame which did not require EPD (i.e., the second frame).

In the alternative, where both the first and second frames are either intended or not intended for discard, there is no problem associated with hash collision because the information in the record is applicable to both frames. That is to say, if both frames are intended for discard, network switch 18 will discard all the data cells of both frames. If both frames are not intended for discard, network switch 18 will route the data cells of both frames to the appropriate outbound links.

Accordingly, if the rate of collision is low, the Packet-Discard operation of the present invention provides a good method for managing congestion control of AAL/UBR traffic on VP connections because it is efficient with respect to storage and processing cycles. In the worst case, hash collision results in the retransmission of the discarded data cells of the frames. The benefits gained in utilizing a hash table, thus, exceeds the detriment of a hash collision occurrence.

The invention having been thus described with particular reference to the preferred forms thereof, it will be obvious that various changes and modifications may be made therein without departing from the spirit and scope of the invention as defined in the appended claims.

We claim:

1. An apparatus for managing the discard of data cells at a switch in an ATM network, said data cells forming portions of frames, but including no beginning of frame markers, said apparatus comprising:
   a table having a number of table addresses less in number than cell identifiers, each table address storing a record for incoming data cells of a frame, said record including an indication whether data cells of said frame are be discarded; and
   processing means for:
   (a) receiving a data cell having a cell identifier;
   (b) determining a table key based on said cell identifier, wherein said table key is within the range of the table addresses;
   (c) accessing the record in said table, associated with said table key, said record and included indication possibly being in error with respect to said received data cell due to: (i) said table key also being associated with a frame that is not associated with said received data cell, and (ii) an absence of said beginning of frame marker;
   (d) utilizing said record to determine whether said data cell is to be discarded; and
   (e) discarding said data cell, if said record indicates that said data cell is to be discarded.

2. The apparatus as recited in claim 1, wherein said record stores indicates an association or non-association of said data cell to the frame in transit to said switch.

3. The apparatus as recited in claim 2, wherein said record further stores information on whether said data cell is to be discarded.

4. The apparatus as recited in claim 1, wherein said cell identifier is based on a Virtual Channel Identifier (VCI) and a Virtual Path Identifier (VPI) of said data cell.

5. The apparatus as recited in claim 4, wherein said cell identifier is further based on a port number (P) at which said data cell is received.

6. The apparatus as recited in claim 1, wherein said cell identifier is the sum of a Virtual Channel Identifier (VCI), a Virtual Path Identifier (VPI) and a port number.

7. The apparatus as recited in claim 1, wherein said processing means performs a hashing operation on said cell identifier to obtain the table key that is within the range of the table addresses.

8. The apparatus as recited in claim 7, wherein said table key is equal to a first N-bits of said cell identifier exclusive Ord (Xor) by a last N-bits of said cell identifier, wherein N is the number of table address bits.

9. The apparatus as recited in claim 1, wherein said table key is equal to said cell identifier, if said table key is within the range of the table addresses.

10. The apparatus as recited in claim 1, wherein said processing means searches said record, associated with said table key, to determine whether said data cell is a beginning-of-frame cell.

11. The apparatus as recited in claim 10, wherein said data cell is the beginning-of-frame cell, if said record is empty.

12. The apparatus as recited in claim 10, wherein said data cell is the beginning-of-frame cell of the frame, said processing means updating said record, associated with said table key, to indicate whether data cells of said frame are to be discarded.

13. The apparatus as recited in claim 12, wherein said processing means determines whether data cells of said frame are to be discarded, based on a priority of said frame.

14. The apparatus as recited in claim 13, wherein said priority of said frame is indicated in a Cell Loss Priority (CLP) field in said data cell.

15. The apparatus as recited in claim 12, wherein said processing means determines whether data cells of said frame are to be discarded based on a service class of said data cell.

16. The apparatus as recited in claim 12, wherein said processing means randomly determines whether data cells of said frame are to be discarded.

17. The apparatus as recited in claim 1, wherein said data cell is an end-of-frame cell, said processing means clearing said record to receive new data.

18. The apparatus as recited in claim 1, wherein said processing means performs the record search approximately within a time period for routing said data cell in said switch.

19. The apparatus as recited in claim 1, wherein said switch is a Virtual Path (VP) switch.

20. A method for discarding data cells at a switch in an ATM network, said data cells forming portions of frames, but including no beginning of frame markers, said switch including a table having a number of table addresses associated with said data cells, each table address having a record for indicating whether a data cell is to be discarded, the number of table addresses being less than a possible number of cell identifiers, the method comprising the steps of:

(a) receiving the data cell at said switch, said data cell having associated therewith a cell identifier;

(b) determining a table key for said data cell, based on said cell identifier, said table key having a value within a range of the table addresses;

(c) searching a record in said table, associated with said table key, to determine whether said data cell is to be discarded, said record and included indication possibly being in error with respect to said received data cell due to: (i) said table key also being associated with a frame that is not associated with said received data cell, and (ii) an absence of said beginning of frame marker; and (d) discarding said data cell, if said record indicates that said data cell is to be discarded.

21. The method as recited in claim 20 wherein said step (b) hashes said cell identifier to determine a table key within the range of the table addresses.

22. The method as recited in claim 20, wherein said step (b) sets said table key equal to said cell identifier, if said cell identifier is within the range of the tables addresses.

23. The method as recited in claim 22, wherein said step (b) performs a hash operation on said cell identifier to determine said table key within the range of the table addresses, if said cell identifier is outside the range of the table addresses.

24. The method as recited in claim 20, further comprising the step (e) of determining whether said data cell is a beginning-of-frame cell of the frame.

25. The method as recited in claim 24, wherein said data cell is the beginning-of-frame cell of the frame, if said record associated with said table key is empty.

26. The method as recited in claim 24, wherein said step (e) further comprises the step of updating said record associated with said table key to indicate whether data cells of said frame are to be discarded, if said data cell is the beginning-of-frame cell.

27. The method as recited in claim 26, wherein said step (e) further includes the step of determining whether data cells of said frame are to be discarded, based on a priority of said data cell.

28. The method as recited in claim 26, wherein said step (e) further includes the step of determining whether data cells of said frame are to be discarded, based on a service class of said data cell.

29. The method as recited in claim 26, wherein said step (e) further includes the step of randomly determining whether data cells of said frame are to be discarded.

30. The method as recited in claim 24, wherein said step (e) further comprises the step of updating said record associated with said table key to indicate that said frame is in transit.

31. The method as recited in claim 20, further comprising the step (e) of determining whether said data cell is an end-of-frame cell of the frame.

32. The method as recited in claim 31, wherein said step (f) further comprises the step of clearing said record, associated with said table key, to receive new information, if said data cell is the end-of-frame cell.

* * * * *